United States Patent [19]
Kato

[11] Patent Number: 5,995,952
[45] Date of Patent: Nov. 30, 1999

[54] NEURAL NETWORK FOR PROVIDING HINTS TO PROBLEM SOLVING APPARATUS USING TREE SEARCH METHOD

[75] Inventor: Hideki Kato, Kawasaki, Japan

[73] Assignee: Fujitsu Limited, Kawasaki, Japan

[21] Appl. No.: 08/728,863

[22] Filed: Oct. 10, 1996

[30] Foreign Application Priority Data

Oct. 11, 1995 [JP] Japan ..................................... 7-263359

[51] Int. Cl.$^6$ .................................................. G06F 15/18
[52] U.S. Cl. ................................ 706/15; 706/14; 706/16; 706/19; 706/25
[58] Field of Search ................................ 395/21, 23, 24; 706/14, 15, 16, 19, 25, 26, 27

[56] References Cited

U.S. PATENT DOCUMENTS 5,140,530   8/1992   Guha ........................................ 706/13

OTHER PUBLICATIONS

Lee and Mahajan, "development of a world class othello program," artificial intelligene, v 43, pp. 21–36, 1990, Dec. 1990.

Moriarty, "Improving Game Tree Search with Evolutionary Neural Networks," 1994 IEEE Conference on Evolutionary Computation, Aug. 1994.

Kajiura, "Neural Networks US. Tree Search in Puzzle Solving" Keio University Dept. of EE, Yokohama Japan, 1989.

Primary Examiner—Tariq R. Hafiz
Assistant Examiner—Jason W. Rhodes
Attorney, Agent, or Firm—Staas & Halsey

[57] ABSTRACT

A problem solving unit obtains a solution in a symbol process in response to a given problem. A neural network learning control unit makes a neural network unit perform a learning process on a solution output from the problem solving unit. After completing the learning process in response to the given problem, the neural network unit provides an output as a hint on solving the problem to the problem solving unit.

17 Claims, 20 Drawing Sheets

STARTING PATTERN

FIG. 1A

GOAL PATTERN

FIG. 1B

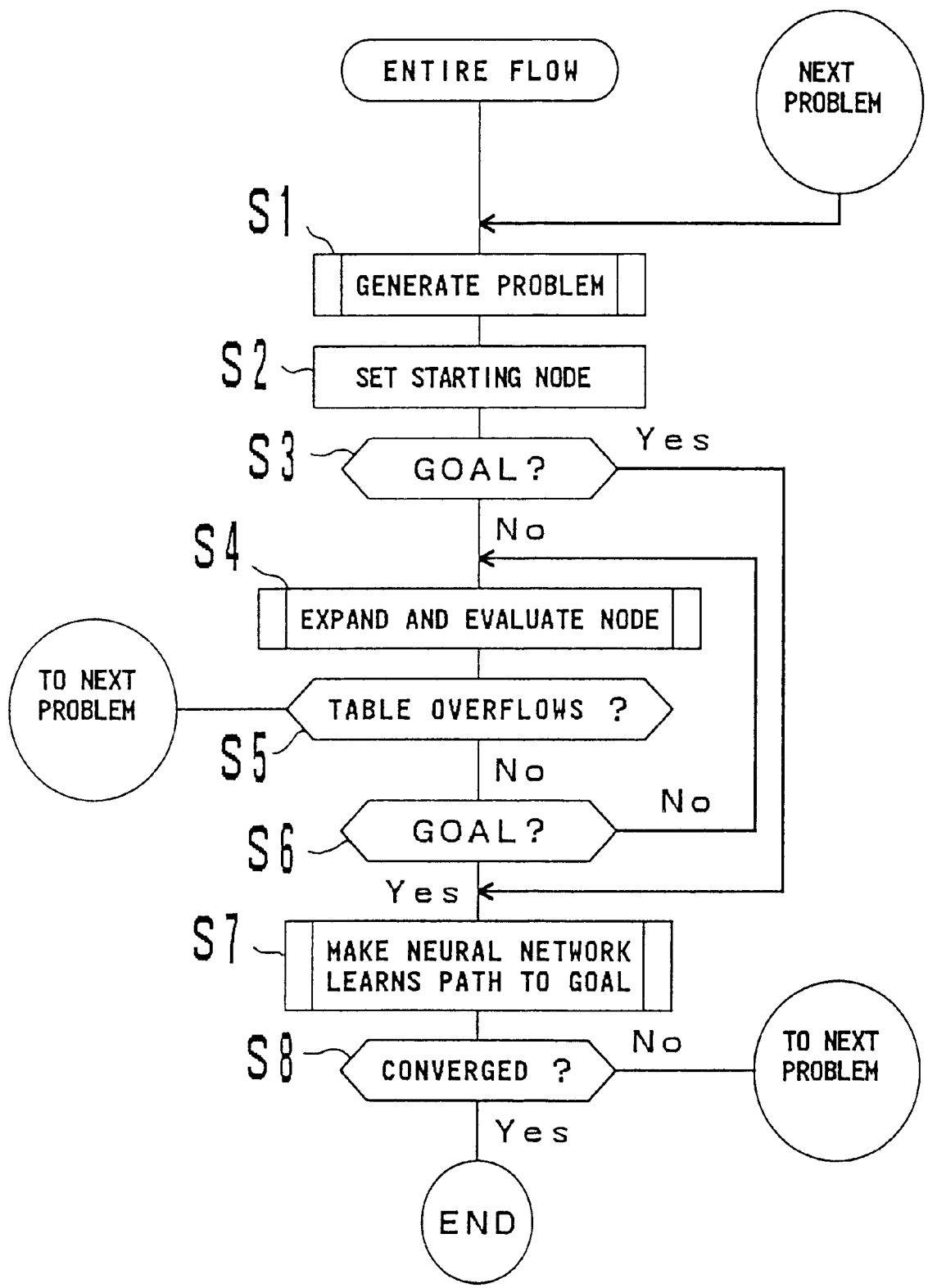
F I G. 7

STRUCTURE OF ENTRY
ON TABLE

OWN NUMBER
DEPTH
EVALUATION VALUE
NUMBER OF PARENT NODE
BLANK POSITION
EXPANDED OR UNEXPANDED ?
PRESENT PATTERN ( 5 × 5 )
( −1 INDICATES OUTSIDE OF
  BOARD, AND 0 INDICATES
  BLANKS )

FIG. 8A

EXAMPLE OF TABLE ENTRY

| 0 |
| 0 |
| 1 |
| −1 |
| 2,3 |
| TRUE |

| −1 | −1 | −1 | −1 | −1 |
| −1 | 1 | 2 | 3 | −1 |
| −1 | 4 | 5 | 6 | −1 |
| −1 | 7 | 0 | 8 | −1 |
| −1 | −1 | −1 | −1 | −1 |

| 1 |
| 1 |
| 4 |
| 0 |
| 3,3 |
| FALSE |

| −1 | −1 | −1 | −1 | −1 |
| −1 | 1 | 2 | 3 | −1 |
| −1 | 4 | 5 | 6 | −1 |
| −1 | 7 | 8 | 0 | −1 |
| −1 | −1 | −1 | −1 | −1 |

| 1 | 2 | 3 |
| 4 | 5 | 6 |
| 7 |   | 8 |

STARTING PATTERN

| 1 | 2 | 3 |
| 4 | 5 | 6 |
| 7 | 8 |   |

GOAL PATTERN

POSITION WHERE 1 IS DETECTED

FIG. 13C
| o | o | o |
|---|---|---|
| o | o | o |
| 1 | o | o |

POSITION WHERE 2 IS DETECTED

FIG. 13D
| o | o | o |
|---|---|---|
| o | 1 | o |
| o | o | o |

POSITION WHERE 3 IS DETECTED

FIG. 13E
| o | o | o |
|---|---|---|
| o | o | 1 |
| o | o | o |

POSITION WHERE 4 IS DETECTED

FIG. 13F
| 1 | o | o |
|---|---|---|
| o | o | o |
| o | o | o |

POSITION WHERE 5 IS DETECTED

FIG. 13G
| 1 | o | o |
|---|---|---|
| o | o | o |
| o | o | o |

POSITION WHERE 6 IS DETECTED

FIG. 13H
| 1 | o | o |
|---|---|---|
| o | o | o |
| o | o | o |

POSITION WHERE 7 IS DETECTED

FIG. 13I
| o | o | 1 |
|---|---|---|
| o | o | o |
| o | o | o |

POSITION WHERE 8 IS DETECTED

FIG. 13J
| o | 1 | o |
|---|---|---|
| o | o | o |
| o | o | o |

POSITION WHERE BLANK IS DETECTED

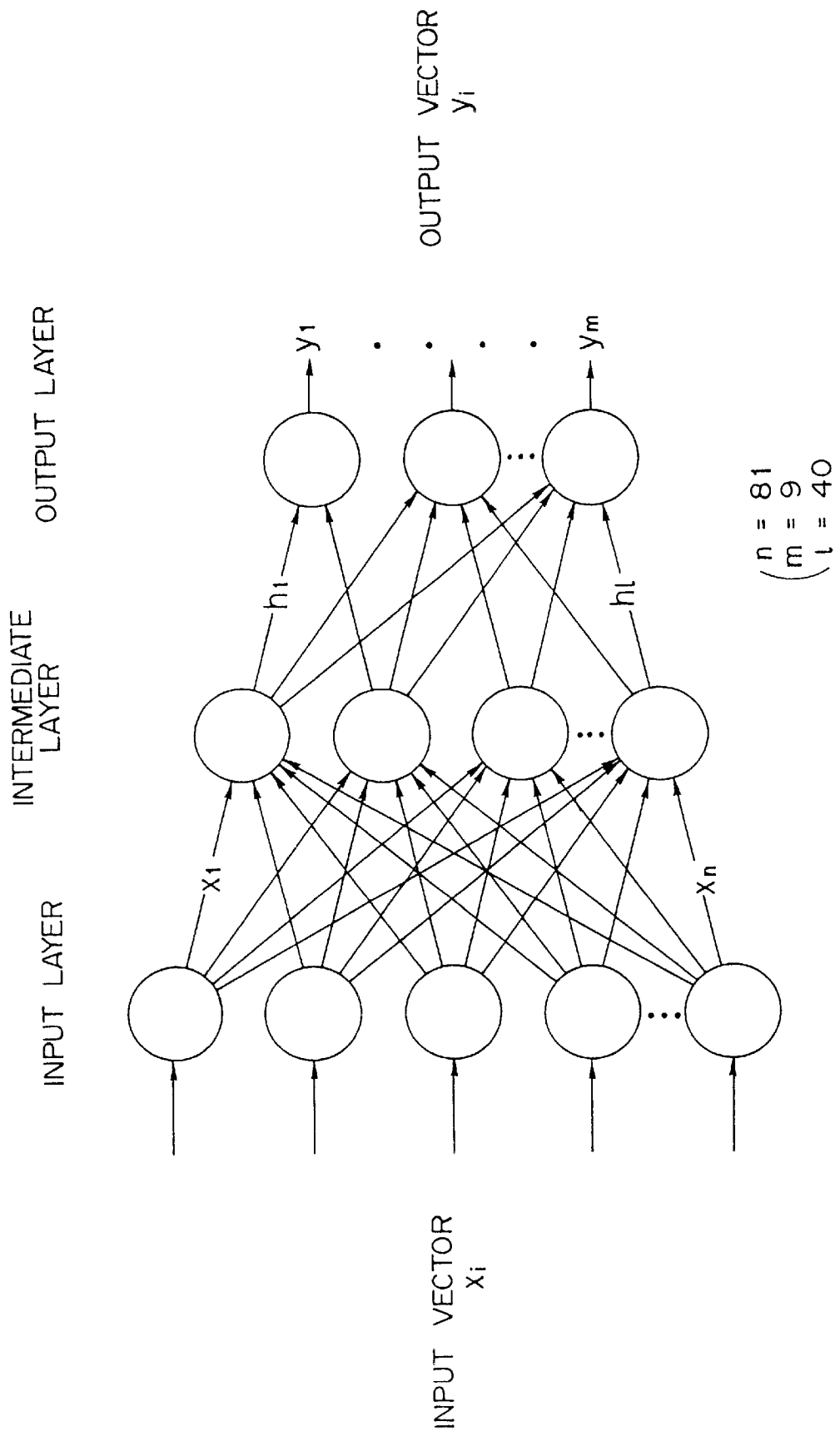
FIG. 14 3-LAYER NEURAL NETWORK

BUILT-IN ARITHMETIC UNIT

EXTERNALLY MOUNTED ARITHMETIC UNIT
(SOME UNITS ARE BUILT-IN UNITS)

COMPUTER ENVIRONMET

NEURAL NETWORK FOR PROVIDING HINTS TO PROBLEM SOLVING APPARATUS USING TREE SEARCH METHOD

BACKGROUND OF THE INVENTION

1. Field of the Invention

The present invention relates to a data processing unit, more specifically to a problem solving apparatus for processing symbols, and provides a learning function for the problem solving apparatus.

2. Description of the Related Art

In the field of artificial intelligence, most problem solving methods being developed are based on a trial-and-error search concept. That is, a problem is solved by searching for one solution in a space where the solution can exist. The present invention is based on a problem solving apparatus operated by a tree searching method in the symbol process.

The tree searching method in the symbol process is described below by referring to a simple example.

FIGS. 1A and 1B show an 8-tile puzzle. In this puzzle, there is an empty space of one frame and eight numbered tiles which are freely movable in the up, down, right, and left directions in a 3×3-block frame. When one of the numbered tiles above, below, right, and left of the space is moved into the space, the previous position of the moved number tile becomes the space. In other words, when the number tile is moved, the space appears to have moved.

In the 8-tile puzzle, a problem is that, for example, a starting pattern as shown in FIG. 1A is to be converted into a goal pattern as shown in FIG. 1B. Assuming that moving the space once is regarded as one step, a solution is obtained by tracing a path to the goal pattern shown in FIG. 1B in the smallest possible number of steps.

FIG. 2 shows an example of the result of the tree searching process to solve the problem shown in FIGS. 1A and 1B.

In the tree structure, one state of the arrangement of the numbered tiles in the 8-tile puzzle is referred to as a "node". That is, FIG. 1A shows the arrangement at a starting node, FIG. 1B shows the arrangement at a goal node. In the tree structure, each node has only one parent node except the starting node, which is a specific node having no parent node.

In the tree search, the efficiency of the searching process is greatly affected by the order from the starting node to the child nodes, that is, by how the nodes are expanded.

The order can be determined by, for example, a breadth-first method, a depth-first method, etc.

FIG. 2 shows a result of the breadth-first method. In the breadth-first method, nodes are sequentially expanded in the order in which the nodes were generated. In FIG. 2, the three child nodes 2, 3, and 4 are generated from the starting node 1. That is, the nodes are first generated in the horizontal direction by priority, and the nodes in the first row (depth 1), second row (depth 2), . . . are generated in this order.

On the other hand, the last generated node is first expanded in the depth-first method. That is, nodes are generated in the order from the starting node 1 to nodes 2, 5, 10, 20, 11, 21, . . . That is, the nodes are expanded in the vertical direction by priority.

In FIG. 2, the goal node is obtained as a child node to node 26, and the solution path to the problem shown in FIGS. 1A and 1B in the 8-tile puzzle is indicated by bold lines. By moving the space 5 times (in 5 steps), the starting pattern (FIG. 1A) is converted into the goal pattern (FIG. 1B), and the goal node cannot be reached with a smaller number of times of moving the space.

FIG. 3 is a block diagram showing the configuration of the conventional problem solving apparatus operated in a symbol process.

In FIG. 3, a problem is generated by a problem generating apparatus 101, and the generated problem is provided for the problem solving apparatus 100.

The problem solving apparatus 100 performs the problem solving process as shown in FIG. 2 until a solution can be obtained through a tree search, and comprises a node expanding apparatus 102 and a node evaluating apparatus 103.

The node expanding apparatus 102 generates a child node from a parent node, that is, it expands nodes.

The node evaluating apparatus 103 evaluates the node expanded by the node expanding apparatus 102 as to whether or not the node refers to a goal node.

The processes of the node expanding apparatus 102 and node evaluating apparatus 103 are repeated until the solution is successfully obtained.

However, if a random searching method is followed by either the depth-first method or breadth-first method in the tree search, then the process of detecting a path to the goal node refers to a wasteful process. When the number of nodes expanded before the optimum path is detected is too large, a considerably long time and a large amount of stored information are spent on the search.

Conventionally, a solution can be obtained in a reduced search space and in a reasonable time by introducing information indicating the rule of thumb, that is, information referred to as heuristic knowledge. The word "heuristic" means "serving to discover". The heuristic information is used to help a goal node be reached in the search by extending the most probable node first from experience.

In using the above described method, it is necessary for a user to appropriately detect the required heuristic knowledge and provide it to a problem solving apparatus, involving a great expenditure of labor and time.

Furthermore, in solving a problem already solved, the conventional problem solving apparatus again requires the process time spent in practically solving the problem first. That is, a problem similar to a problem solved already, requires the same process time, without shortening it.

SUMMARY OF THE INVENTION

The present invention aims at providing a problem solving apparatus having a learning function. The problem solving apparatus obtains a solution in a reasonable time without heuristic knowledge or through simple heuristic knowledge and obtains a solution within a short when solving the problem based on the leaving result of the already solved problem.

The problem solving apparatus having the learning function according to the present invention includes a problem solving unit for obtaining a solution in a symbol process upon receipt of a given problem, a neural network unit for providing a hint on solving the problem for the problem solving unit, and a neural network learning control unit for making the neural network unit perform a learning process.

When the problem solving unit of the above described problem solving apparatus receives a problem similar to a problem already solved, it obtains a solution within a short time by receiving a hint on solving the problem based on the learning result of the problem already solved.

BRIEF DESCRIPTION OF THE DRAWINGS

FIGS. 1A and 1B show examples of an 8-tile puzzle problem;

FIG. 7 is a flowchart showing the entire process of the problem solving apparatus according to the present invention;

FIGS. 8A through 8C show the contents of the table for storing the information about the arrangement about numbered tiles;

FIGS. 13A and 13B show practical examples of converting data into a representation for input to a neural network;

FIG. 14 shows the 3-layer hierarchical neural network;

DESCRIPTION OF THE PREFERRED EMBODIMENT

The embodiments of the present invention are described below by referring to the attached drawings.

In the following description of the embodiments, the above described "space" may be referred to as a "blank".

Figure 4:
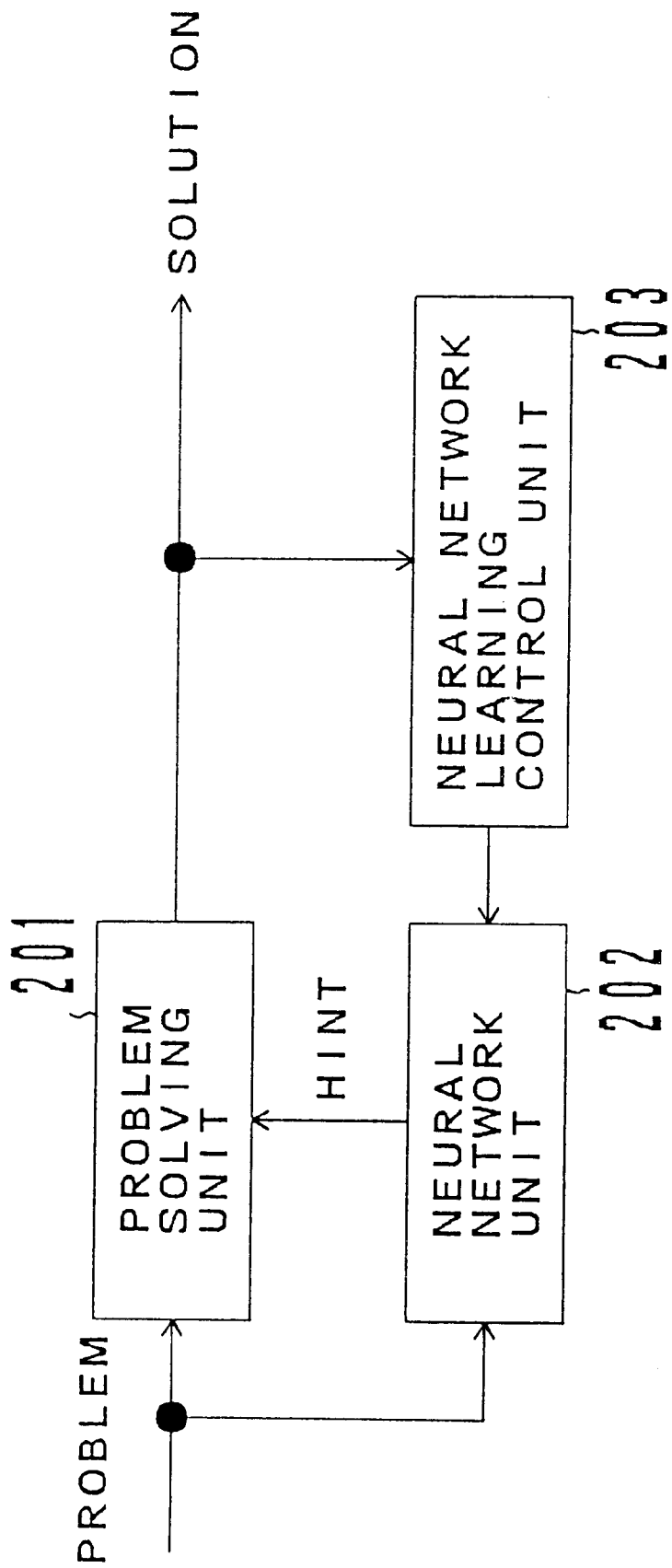
FIG. 4 is a block diagram showing the principle of the problem solving apparatus according to the present invention.

FIG. 4 is a block diagram showing the principle of the present invention.

FIG. 4 shows the principle of the problem solving apparatus for solving a given problem through a tree search in a symbol process, and the problem solving apparatus has a learning function.

In FIG. 4, a problem solving unit 201 receives a given problem and obtains a solution in a symbol process. For example, it obtains a solution through a tree search.

A neural network unit 202 receives a given problem and provides a hint on obtaining a solution to the problem for the problem solving unit 201.

A neural network learning control unit 203 makes the neural network unit 202 perform a learning process using the solution output from the problem solving unit 201.

The problem solving unit 201 comprises a problem solving apparatus for performing, for example, a symbol process. Then, the neural network unit 202 outputs a hint on obtaining a solution, and the hint is used as follows.

Figure 3:
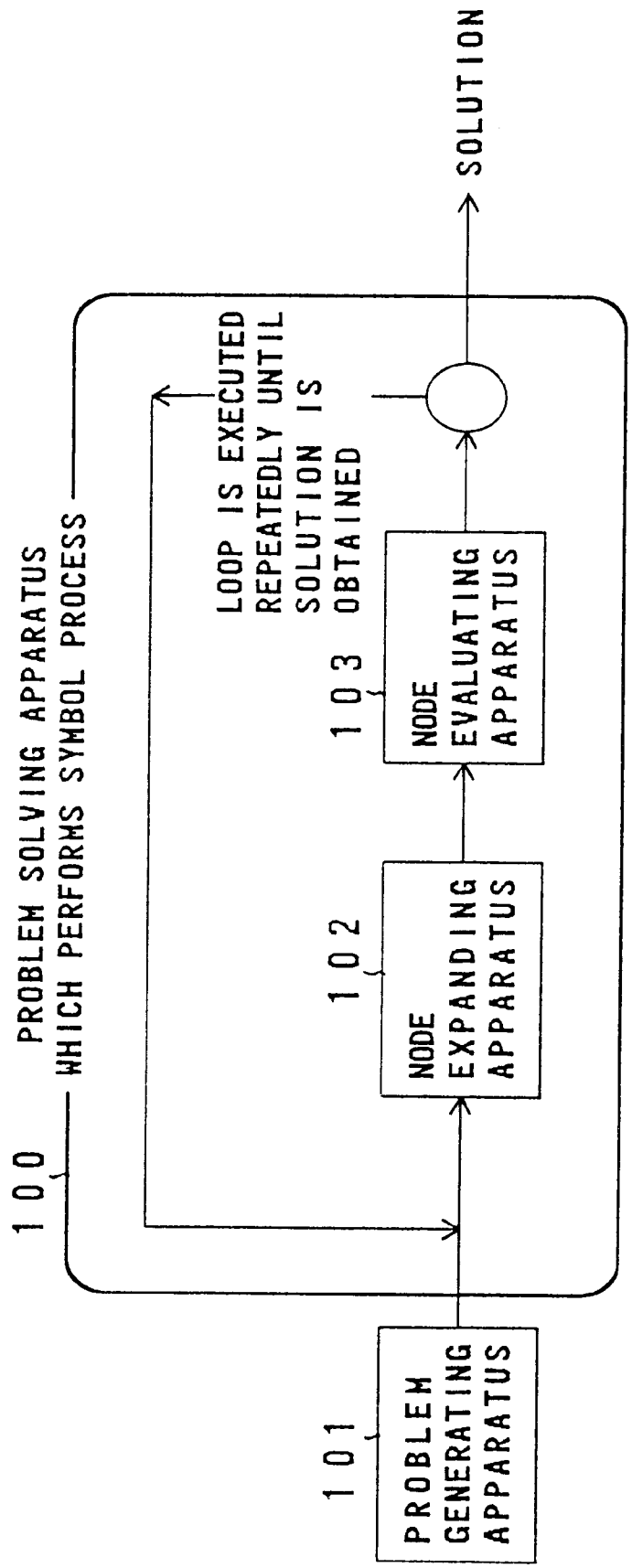
FIG. 3 is a block diagram showing the configuration of the problem solving apparatus in the conventional symbol process.

The problem solving apparatus for performing the symbol process through the problem solving unit 201 comprises a node expanding apparatus and a node evaluating apparatus as in the conventional example shown in FIG. 3. In the present embodiment, the above described breadth-first method and depth-first method are replaced by a method using, for example, evaluation functions.

A method using evaluation functions (best-first method) is a well-known method. The references are listed below.

"Artificial Intelligence—Theory of System for solving a problem" written by N. J. Nilsson, translated by Shuhei Goda, and Kazuhiko Masuda, published in 1973 by Colona; originated from "Problem-Solving Methods in Artificial Intelligence" by Nils J. Nilsson, 1971, McGRAW-HILL BOOK CO., INC.

For example, in a node expanding apparatus, a node having the smallest evaluation function in unexpanded nodes (that is, the nodes whose child nodes have not been obtained) is selected, and the position of a blank (space) is shifted. Based on the result, the node evaluating apparatus obtains an evaluation function for the child node. The evaluation function is computed by a predetermined equation.

When, according to an embodiment of the present invention, the output from the neural network unit 202 to an expanded node matches the output from the node expanding apparatus (that is, when the hint as to in which direction the position of the blank should be shifted (for example, a new position of the blank) matches the child node as a blank position shift result), the difference obtained by subtracting a predetermined value from a result of the above described equation is defined as an evaluation function for the child node.

When the arrangement of the blank position shift result matches the hint output from the neural network unit 202, there is a high possibility of selecting a node that matches the hint in the next step (loop). That is, the result of the learning performed through the neural network is effective in detecting the optimum path in the tree searching process.

The processes performed by the node expanding apparatus and node evaluating apparatus are similarly repeated as shown in FIG. 3. When a solution is detected, the neural network learning control unit 203 performs a learning process through the neural network unit 202 using the solution. In this learning process, a common back-propagation method is used.

As described above, a problem solving apparatus having a learning function is designed through a neural network according to the present invention.

Figure 5:
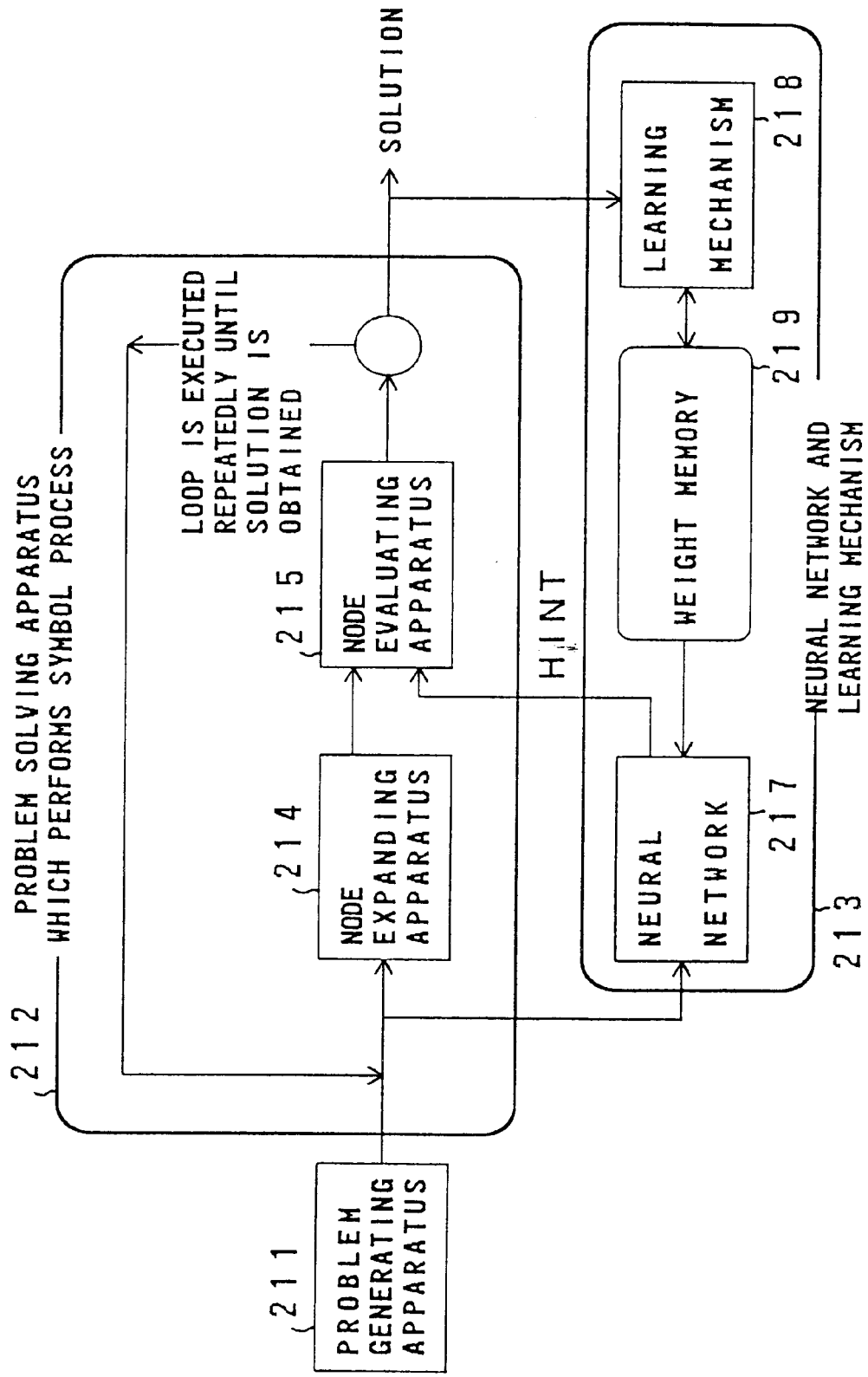
FIG. 5 is a block diagram showing the configuration of the problem solving apparatus having the learning function according to an embodiment of the present invention.

FIG. 5 is a block diagram showing the configuration of the problem solving apparatus having the learning function according to the present embodiment.

In FIG. 5, the problem solving apparatus having the learning function comprises a problem generating apparatus 211, a problem solving apparatus 212 for performing a symbol process, and a neural network and learning mechanism 213.

The problem solving apparatus 212 comprises a node expanding apparatus 214 and a node evaluating apparatus 215 as in the conventional example shown in FIG. 3. The present embodiment is different from the conventional method in that a node is expanded and evaluated using an evaluation function based on a predetermined equation.

The neural network and learning mechanism 213 comprises a 3-layer hierarchical neural network 217, a learning mechanism 218 for controlling the learning process performed by the neural network 217 using a solution output by the problem solving apparatus 212, and a weight memory 219 for storing the weight for the neural network 217.

Figure 6:
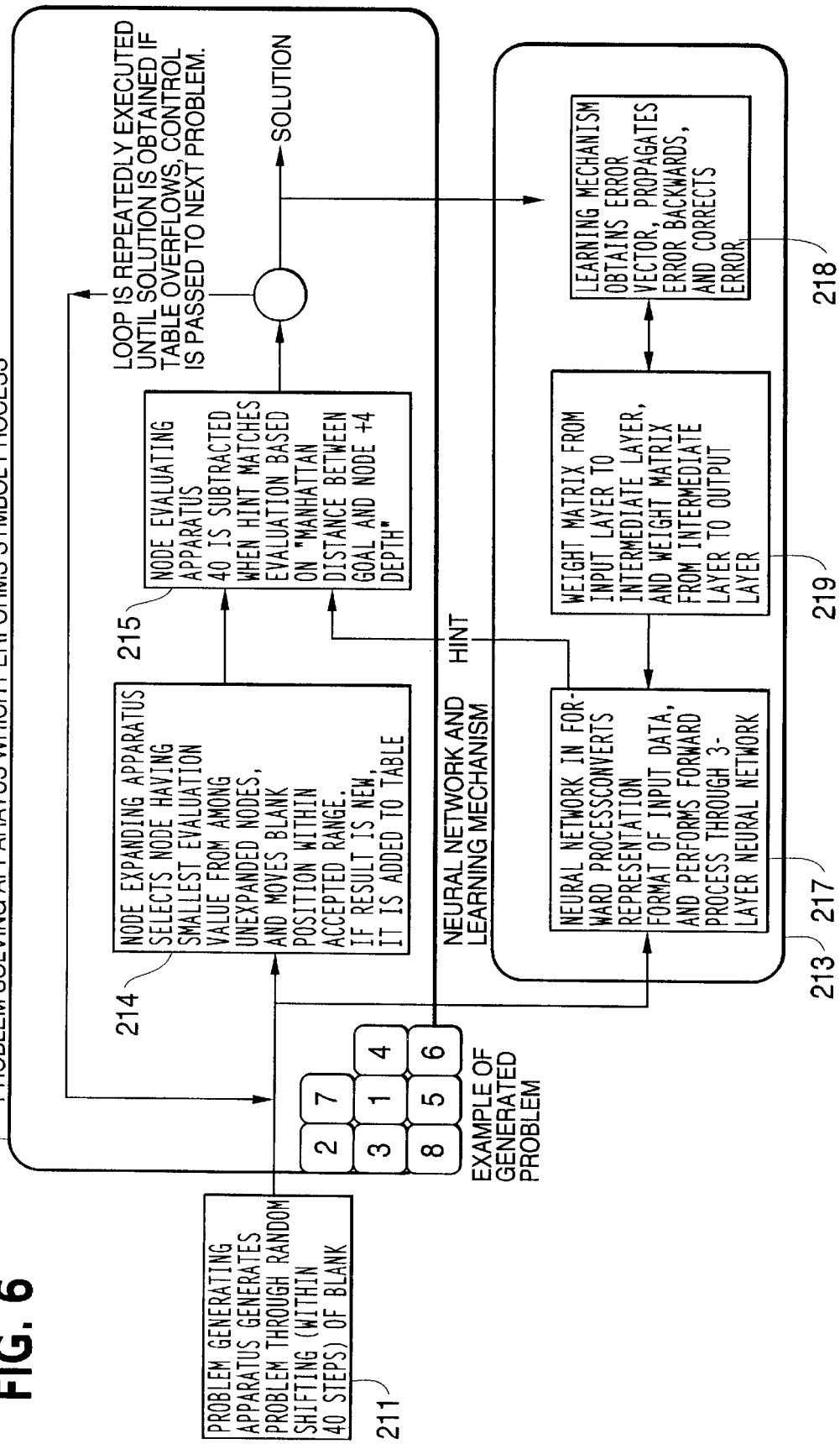
FIG. 6 shows the operations of the problem solving apparatus having a learning function for the 8-tile puzzle.

FIG. 6 shows the operations performed by the problem solving apparatus having a learning function in the 8-tile puzzle as shown in FIG. 5.

In FIG. 6, the problem generating apparatus 211 generates a problem by shifting a space at random (n steps). The problem is provided for the node expanding apparatus 214 in the problem solving apparatus 212 for performing a symbol process, and for the neural network 217 in the neural network and learning mechanism 213.

The node expanding apparatus 214 selects a node having the smallest evaluation function (described later) of all unexpanded nodes and shifts the position of the blank based on the selection result. After the shift, unless the arrangement of the number tile corresponding to the child node of the selected node has not appeared so far in the process, the data on the arrangement is added to the table. The storage of the data on the table is described later.

The neural network 217 performs a forward process in response to the output from the problem generating apparatus 211, and the result is output as a hint to the node evaluating apparatus 215. In the forward process performed by the neural network 217, the representation of input data is converted and the forward process is performed through the 3-layer neural network. The conversion of the representation is described later.

The node evaluating apparatus 215 obtains the evaluation function corresponding to an expanded node. According to the present embodiment, a calculation is made by the following equation (1) using an evaluation function d.

$$d = \text{Manhattan distance from goal pattern} + (4 \times \text{depth}) \quad (1)$$

Figure 2:
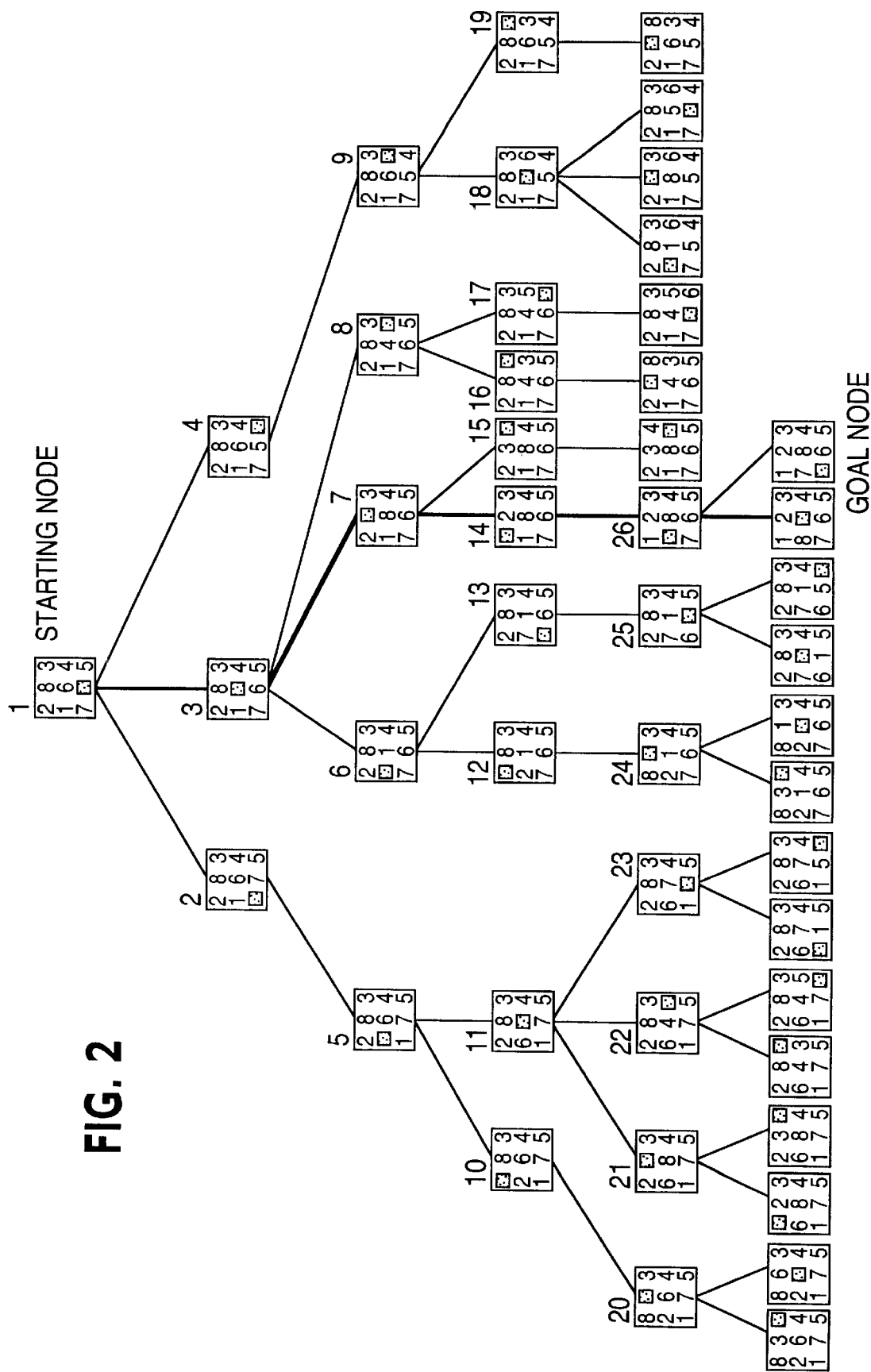
FIG. 2 shows a result of a tree search in response to the problem shown in FIGS. 1A and 1B.

(where the Manhattan distance indicates $|x_1-x_2|+|y_1-y_2|$ between the two points $(x_1, y_1)$ and $(x_2, y_2)$. In the above equation, the sum of the Manhattan distances of the same numbered tiles (excluding a blank) between the present pattern and the goal pattern is defined as the (modified) Manhattan distance to the goal pattern. The depth indicates the ordinal number of row of the node evaluated from the starting node shown in FIG. 2.)

When the child nodes output from the node expanding apparatus 214 match the hint as an output from the neural network 217, that is, when the child nodes as a result of the shift of the position of the blank match the output from the neural network, the node evaluating apparatus 215 outputs as an evaluation function a value obtained by subtracting, for example, 40 from the evaluation function given by the above equation. If the output values do not match each other, the evaluation function in the above equation is used unchanged as an evaluation function.

The value 40 mentioned above is a value obtained by the Inventor from experience with the 8-tile puzzle according to the present embodiment, and corresponds to the depth 10 (the depth 10×4=40 is computed by the above listed equation (1)). The Inventor also has disclosed from experience that the depth is not limited to 10, but an appropriate value of the depth can be 10 through 15. Therefore, the value subtracted from the evaluation function is about 40 through 60. In the present embodiment, 40 is subtracted from the evaluation function.

Until the solution is obtained, that is, until the goal node is detected, the node expanding apparatus 214 continues to shift the position of the blank and, correspondingly, the node evaluating apparatus 215 repeats the calculations for an evaluation function. When a goal node is reached, the path to the goal node is output as a solution. If the number of nodes expanded until the solution is obtained is considerably large and the table described later overflows, that is, the data overflows the storage area for storing data on the arrangement of the numbered tiles of the child nodes obtained as a shift result, then the next problem is processed without searching for the solution to the present problem.

When the path to the goal node, that is, the solution, is detected, the neural network 217 performs a learning process corresponding to each step for the solution. The learning process is controlled by the learning mechanism 218. In the learning process, data corresponding to parent nodes in each step in the path is provided for the input layer unit in the neural network 217. Data corresponding to a child node at each parent node in each step in the path is provided as teaching data to the output layer. Then, the weight is amended according to the common back-propagation method, and the weight value is stored in the weight memory 219 and provided for the neural network 217.

FIG. 7 is a flowchart showing the entire process performed by the problem solving apparatus according to the present invention.

When the process starts as shown in FIG. 7, a problem is generated in step S1. This generating process is described later. Then, in step S2, the starting node is set and it is determined whether or not a goal node has been reached in step S3.

Since the goal node has not been reached yet at first, a node expanding and evaluating process is performed in step S4. This process is also described later. It is determined in step S5 whether or not the table has overflowed. Since it is determined at first that the table has not overflowed, the determination as to whether or not the goal node has been reached is made in step S6. Since it is determined that the goal node has not been reached yet, control is returned to the processes in and after step S4.

If it is determined in step S6 or S3 that the goal node has been reached, then a learning process is performed in step S7 on the path to the goal, that is, on a solution. This process is also described later. If it is determined in step S8 that the learning has converged, then the process terminates.

If it is determined in step S5 that the table has overflowed before the goal node has been reached, or if it is determined in step S8 that the learning through the neural network has not converged, then the solution of the problem or the learning of the solution are interrupted and the processes in and after step S1 are repeated to solve the next problem.

Before explaining in detail the process shown in FIG. 7, the storage contents of the table, which stores the information about the arrangement of a new number tile (child node) each time it appears, is described.

FIGS. 8A through 8C show the contents of the table storing the information about the arrangement of numbered tiles.

FIG. 8A shows an example of the structure of the entry of the above described table. The structure of the entry corresponds to the number of the entry, that is, an assigned number, the depth of a corresponding node, the evaluation function for the node, the number of a parent node, the position of a blank, an expansion state (expanded or unexpanded), and the arrangement of numbered tiles (an arrangement of 5×5).

FIG. 8B shows the starting pattern and goal pattern to practically explain the storage contents of the entry. In this example, extremely simple starting and goal patterns are illustrated. That is, in this example, a goal pattern is reached only by shifting the blank in the starting pattern to right.

FIG. 8C shows an example of the contents of the entry of the table for each of the above described patterns. In FIG. 8C, the number of the entry for the starting pattern is "0" and the depth of the corresponding node is "0". The Manhattan distance as an evaluation function is "1". Since the present node is a starting node, the number of a parent node is "−1". The horizontal and vertical positions of the blank are "2" and "3" respectively, and the determination as to whether or not the nodes are expanded indicates "true".

The contents of the entry corresponding to the goal pattern are similarly defined. The above described evaluation function is "4" because it refers to a goal node and its depth is 1. The number of the parent node is "0" corresponding to the starting pattern.

Figure 9:
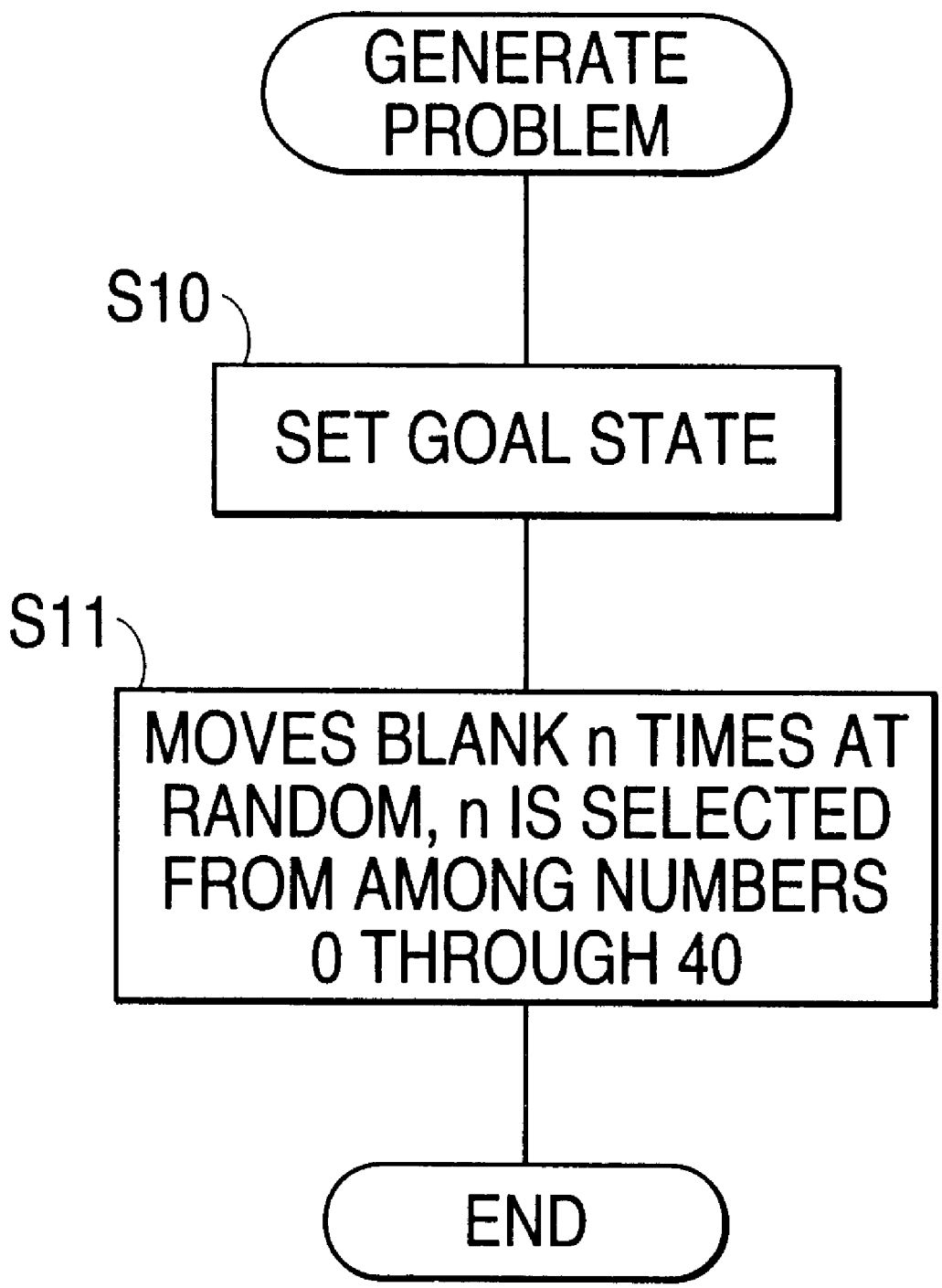
FIG. 9 is a flowchart showing the problem generating process.

FIG. 9 is a flowchart showing the problem generating process in step S1 shown in FIG. 7.

When the process starts as shown in FIG. 9, the goal pattern is set in step S10, and the blank is shifted n times at random in step S11, thereby generating a problem. The value n is selected from, for example, among the numbers 0–40 at random.

Figure 10:
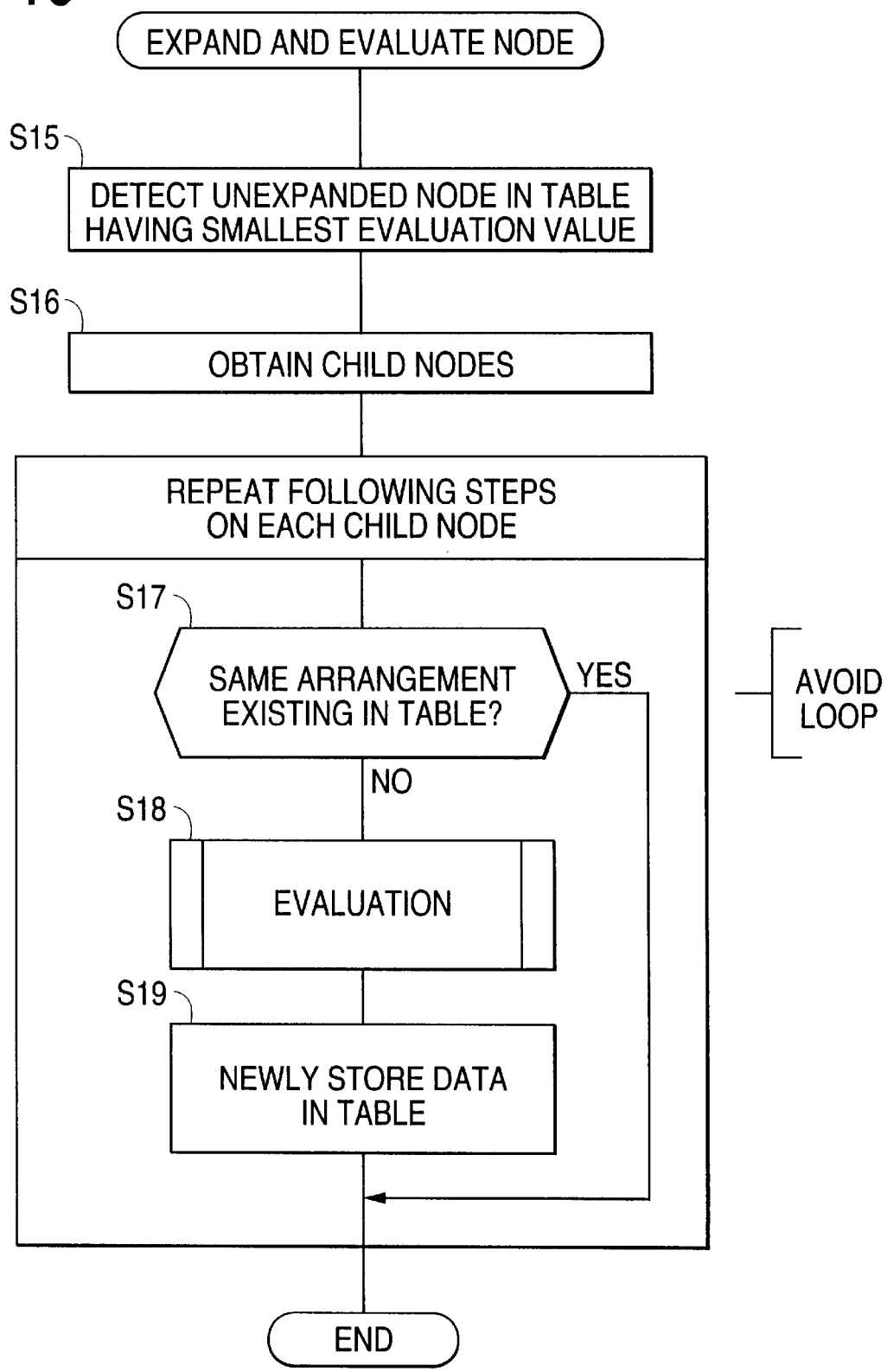
FIG. 10 is a flowchart showing the node expanding process.

FIG. 10 is a flowchart showing the node expanding and evaluating process.

When the process starts in FIG. 10, a node which has not been expanded and has the smallest evaluation function is detected in step S15. In step S16, normally a plurality of child nodes to the detected node are obtained. The processes in steps S17 through S19 are repeated for each child node, thereby terminating the process.

In step S17, it is determined whether or not the same arrangement of numbered tiles as that of the obtained child node exists in the table. If not, an evaluating process, that is, a process of obtaining an evaluation function, is performed in step S18. Based on the result, in step S19, the data corresponding to the child node is newly stored in the table. The evaluation process in step S18 is described later.

When it is determined in step S17 that the same arrangement of numbered tiles exists in the table, no process is performed on the child node of the detected node, and control is passed to another child node to avoid a loop in a tree search process. That is, a node is not selected by the node expanding apparatus 214 if the process in step S18 is not performed on such child nodes, or if those nodes are not evaluated. As a result, a loop can be avoided.

Figure 11:
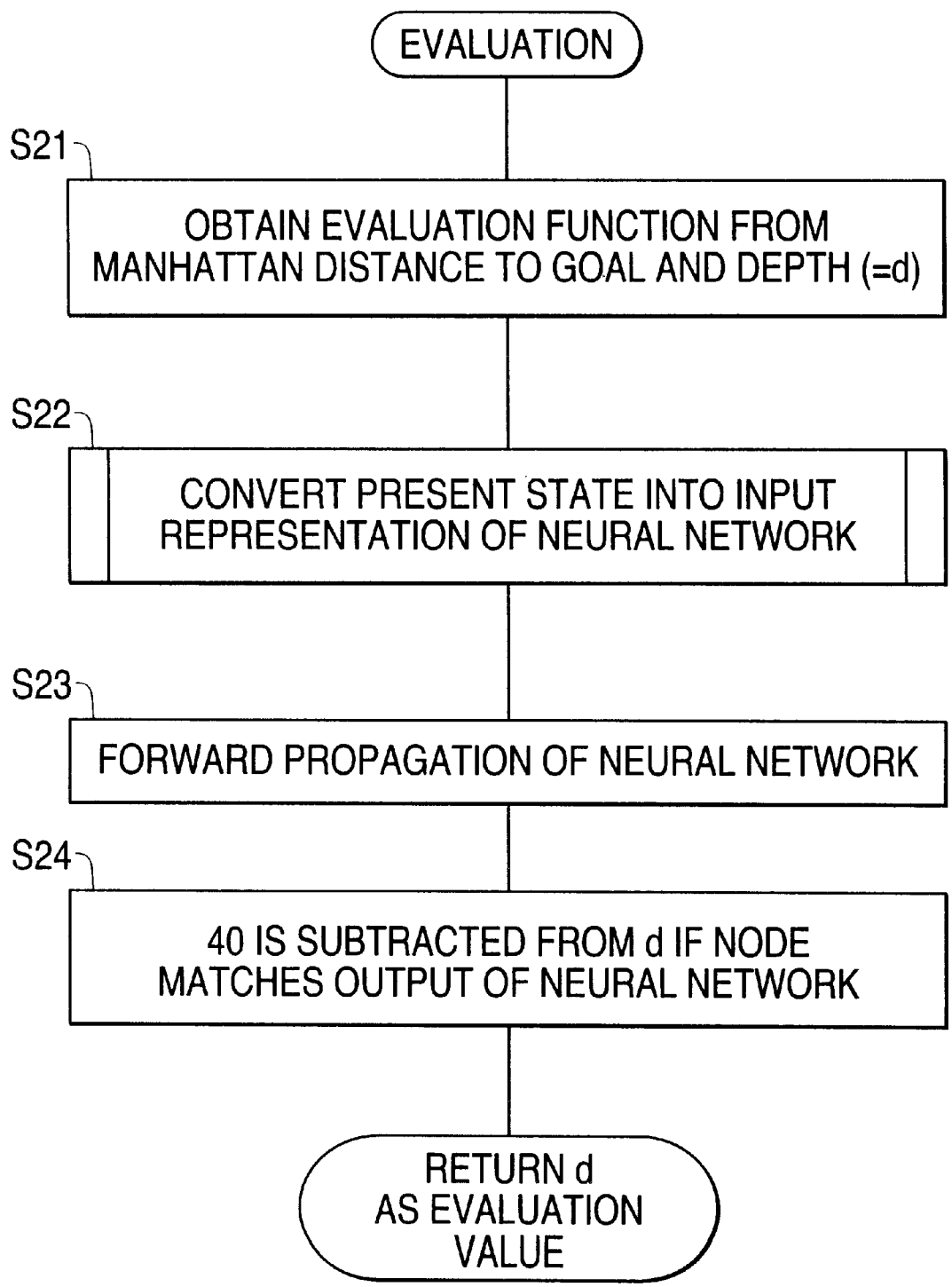
FIG. 11 is a flowchart showing the evaluating process.

FIG. 11 is a flowchart showing the evaluation process in step S18 shown in FIG. 10.

When the process starts as shown in FIG. 11, an evaluation function "d" is obtained by the above described equation based on the Manhattan distance and depth in step S21. In step S22, the present pattern is obtained, that is, the pattern of the parent node is converted into an input representation of the neural network. The conversion process is described later.

In step S23, a forward process is performed through the neural network. In step S24, when a child node to a parent node practically matches the hint output from the neural network, 40 is subtracted from "d" in the child node. In step S25, the resultant value is "d", which is returned as the value of the evaluation function.

Figure 12:
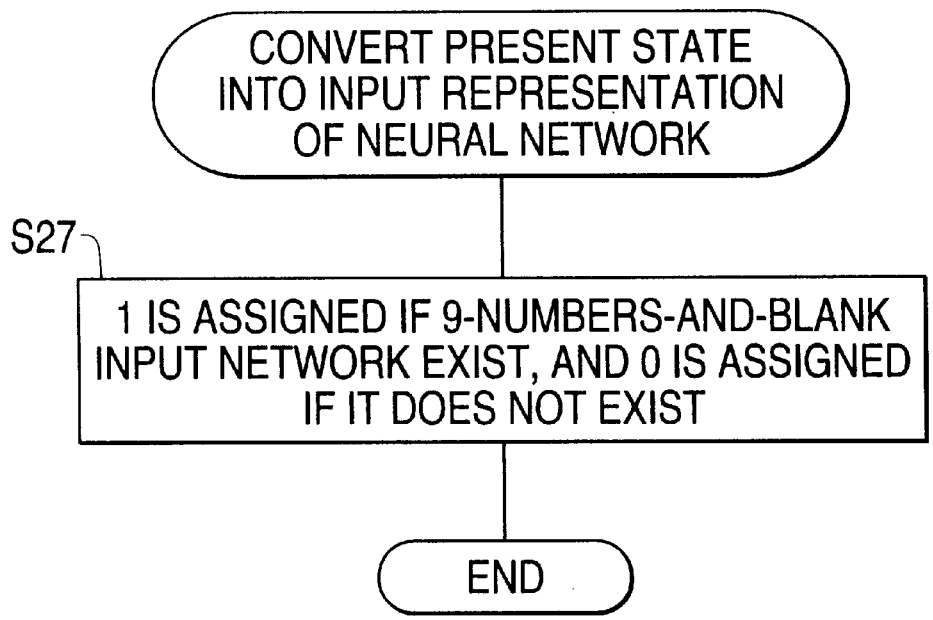
FIG. 12 is a flowchart showing the process of converting data into a representation for input to a neural network.

FIG. 12 is a flowchart showing the process of converting data into an input representation for the neural network in step S22.

In step S27 shown in FIG. 12, a unit is assigned 1 if the arrangement of each number and blank corresponds to the 9 portions in the input layer. Otherwise, it is assigned 0.

FIGS. 13A and 13B show examples of the process in step S27 in FIG. 12. FIG. 13A shows the arrangement of the numbered tiles. FIG. 13B shows the detected portion of each number tile, that is, the concept of inputting a value to an input layer unit corresponding to the parent node.

According to the present embodiment, a 3-layer hierarchical neural network as, for example, shown in FIG. 14, is used as the neural network 217 shown in FIG. 5.

The number n of units in the input layer is 81 in the neural network shown in FIG. 14. 9 units are provided for each of the numbered tiles (1, 2, 3, 4, 5, 6, 7, and 8) and the blank. The arrangement of each number tile and blank is detected using each of the 9 units. For example, an input value of 1 is assigned only to the unit, of the 9 units for use in detecting the position of the number tile 1 in the input layer units, corresponding to the position of the number tile 1 as shown in FIG. 13B. An input value of 1 is assigned only to the unit, of the 9 units for use in detecting the position of the numbered tile 2, corresponding to the position of the number tile 2. The input number 1 of each of the other numbered tiles is similarly assigned.

The neural network shown in FIG. 14 is a 3-layer hierarchical neural network. Each unit is completely coupled to the other units between the layers. The number 1 of the units in the intermediate layer can be 30 through 90. It can be, for example, 40 according to the rule from experience that a half of the number of units in the input layer is appropriate.

On the other hand, the number m of the units in the output layer is 9, and the learning process through the neural network is performed in such a way that the unit corresponding to the new blank position outputs 1. Since the blank is shifted upwards, downwards, to the left, or to the right, the number of units in the output layer can be 4 for the 4 directions.

Figure 15:
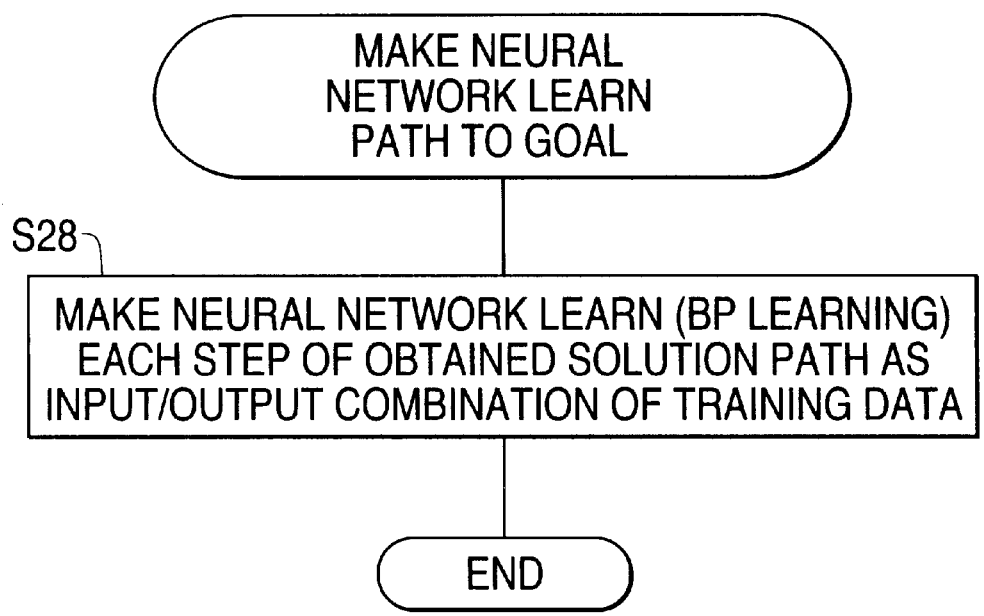
FIG. 15 is a flowchart showing the solution learning process through the neural network.

FIG. 15 shows the process of making the neural network learn the path to the goal shown in step S7 in FIG. 7.

In FIG. 15, the arrangement of the numbered tiles of the parent node in each step of the path obtained as solutions, and the blank shift results are provided as the learning data for the neural network in step S28, thereby performing back-propagation learning.

An example of a relatively small scale search tree is described as follows.

Figure 16:
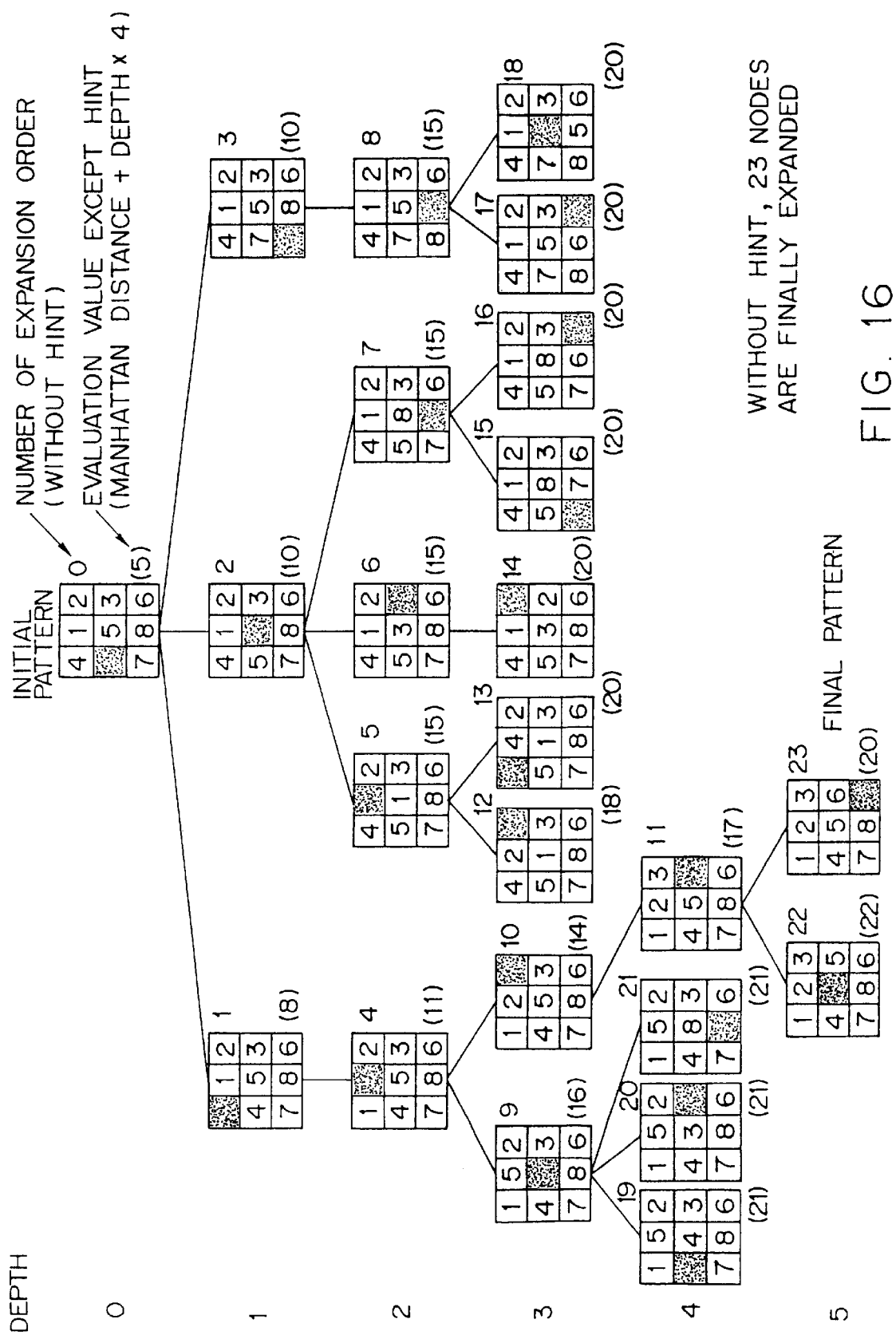
FIG. 16 shows an example of expanding a node using an evaluation function in a relatively small search tree.
Figure 17:
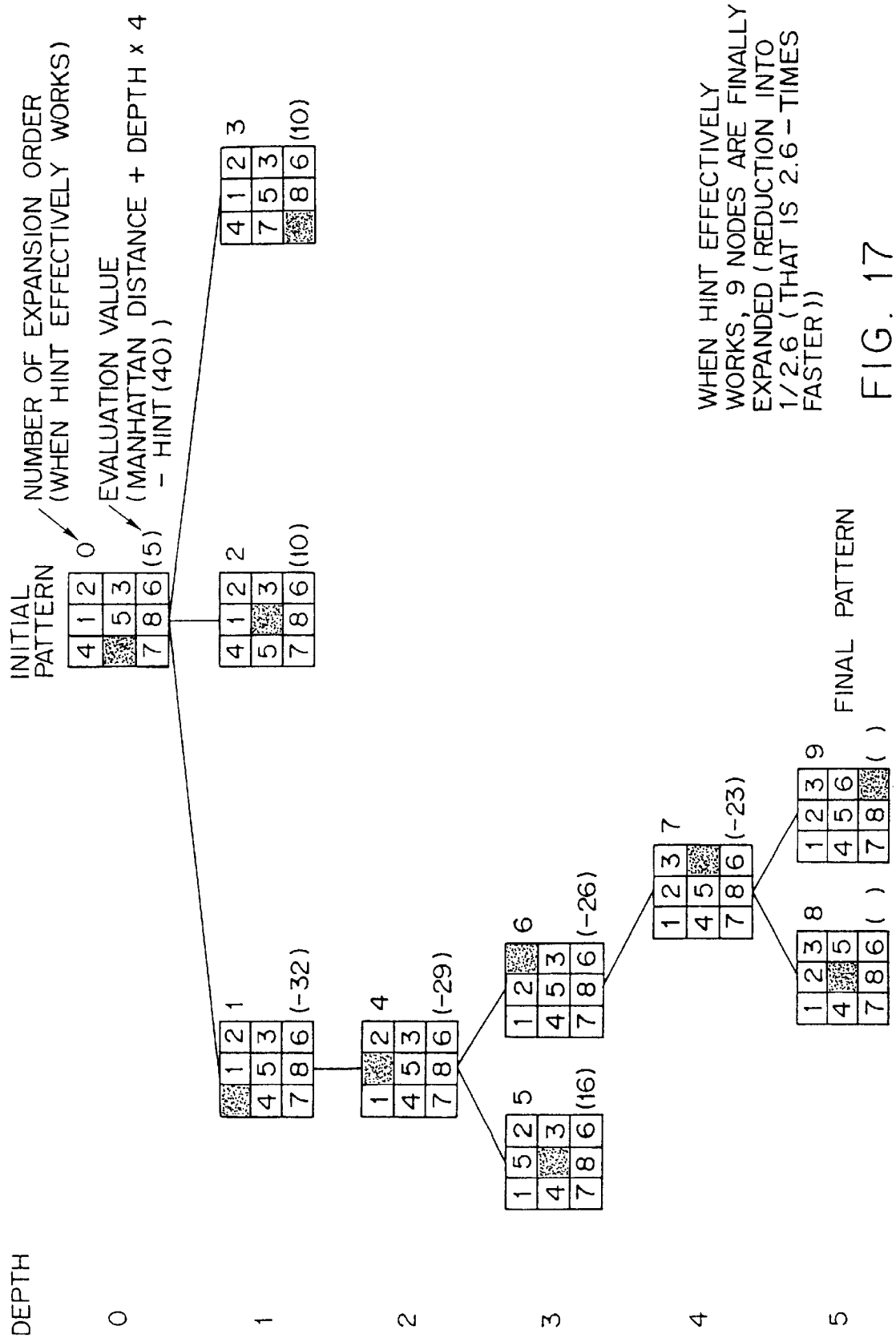
FIG. 17 shows an example of expanding a node when the present invention is applied to the example shown in FIG. 16.

FIG. 16 shows an example of expanding nodes in a method in which an evaluation function in equation (1) is used without a hint in solving an 8-tile puzzle problem. FIG. 17 shows an example of expanding a node in a method according to the present invention in which an evaluation function and a hint are used in solving the same problem as that shown in FIG. 16.

In FIGS. 16 and 17, the arrangements of the numbered tiles 1 through 8 (and the space which indicates the blank frame) are assigned to each node. The expansion order is given at the top right of each node, and the evaluation value of each node is given in parentheses at the bottom right of each node. First, as shown in FIG. 16, the child node (depth 1) to the parent node indicating the initial pattern (expansion number 0) is expanded. That is, the nodes having the expansion numbers 1, 2, and 3 are expanded. Next, a node having the smallest evaluation function is selected from among unexpanded nodes. The selected node is expanded and its child node is obtained. At this stage, the nodes assigned the expansion order numbers 1, 2, and 3 are unexpanded. Among these nodes, the node having the smallest evaluation function is assigned the expansion order number 1, and the child node to this node is expanded. In this example, the only child node to the node having the expansion order number 1 is assigned the expansion order number 4.

Similarly, the node having the smallest evaluation function is selected from among the unexpanded nodes. The process of obtaining a child node to the selected node is sequentially performed. When the node assigned the expansion order number 23 is finally expanded, it matches the goal pattern, thereby terminating the process.

Thus, in the conventional method, the solution cannot be obtained until 23 nodes are expanded.

On the other hand, in the method according to the present invention shown in FIG. 17, the solution can be reached after expanding 9 nodes only. In the example shown in FIG. 17, the path from the node assigned the expansion order number 1, to the final pattern node number 9, through 4, 6, and 7, is preliminarily learned by the neural network. When each of the nodes in the path, that is, nodes 1, 4, 6, 7, and 9, is expanded as a child node, the result matches the hint, and the evaluation value becomes a minimum value by subtracting 40 from the evaluation value. Since the nodes in the path are expanded by priority (by minimizing the evaluation value), the number of finally expanded nodes is smaller than in a conventional method, thereby speeding up the entire process.

Figure 18:
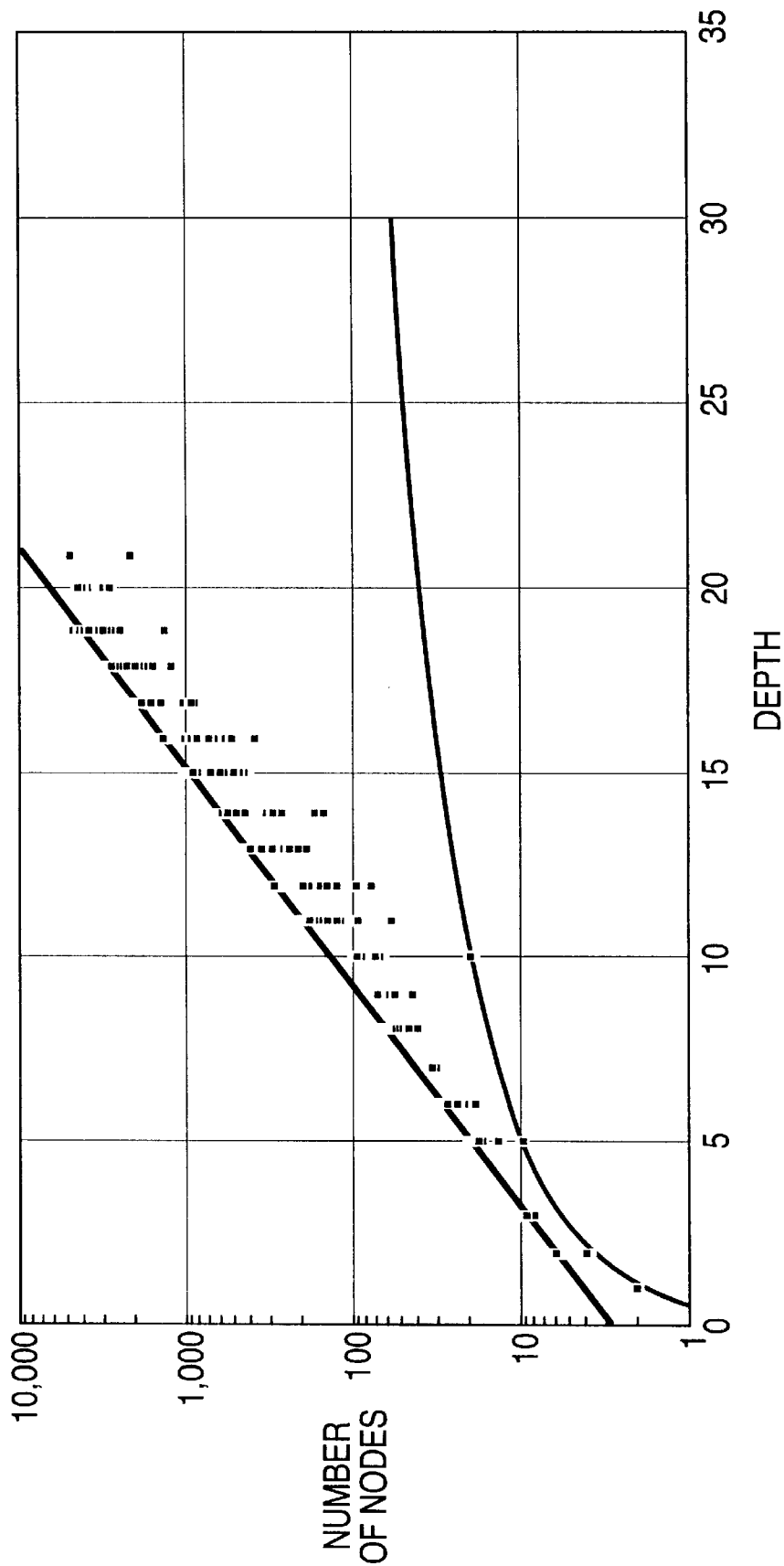
FIG. 18 shows the relationship between the depth of the first 2000 problems and the number of expanded nodes.
Figure 19:
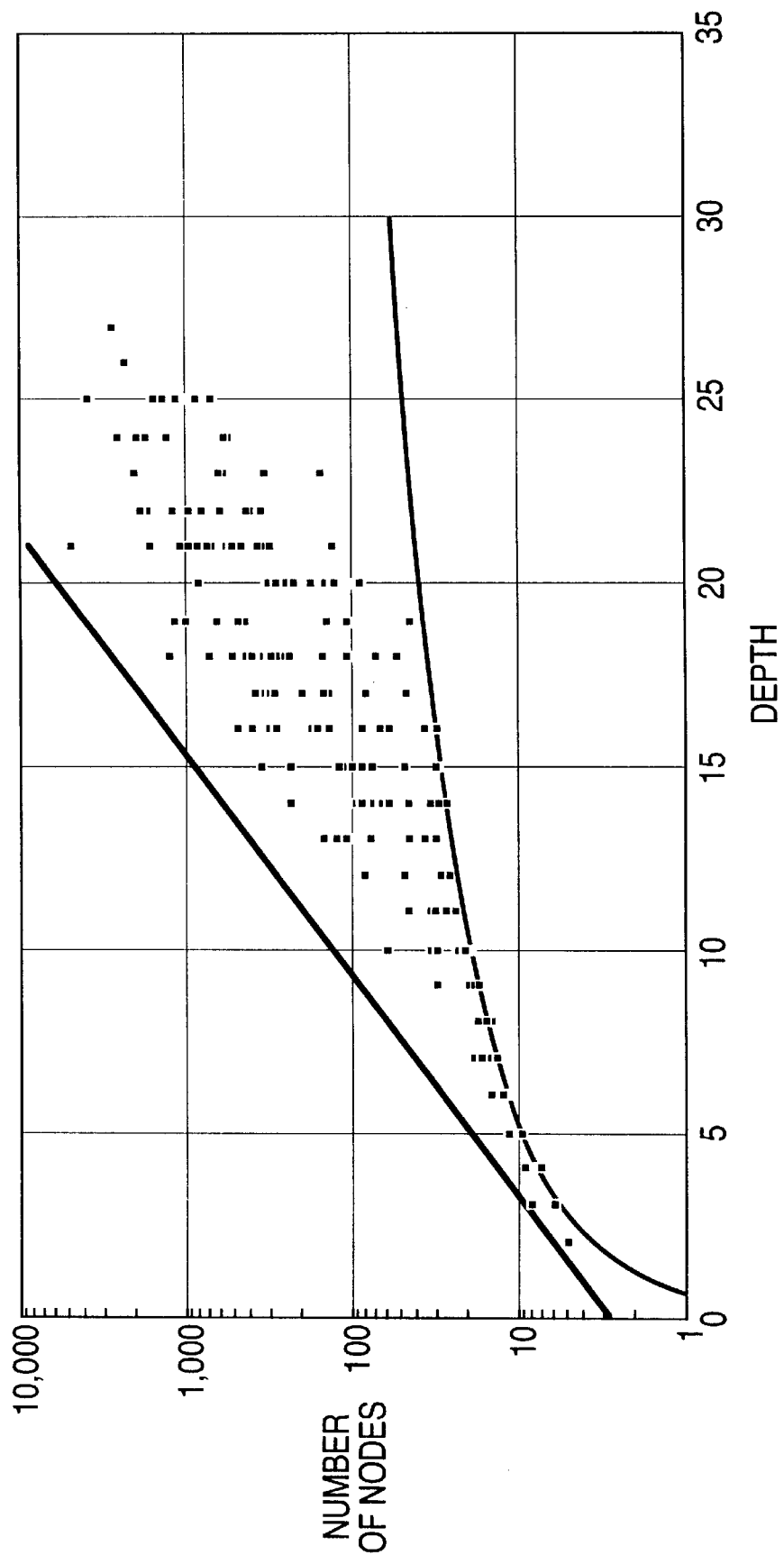
FIG. 19 shows the relationship between the depth of the 10,000th problem to the 2000 problems and the number of expanded nodes.
Figure 20:
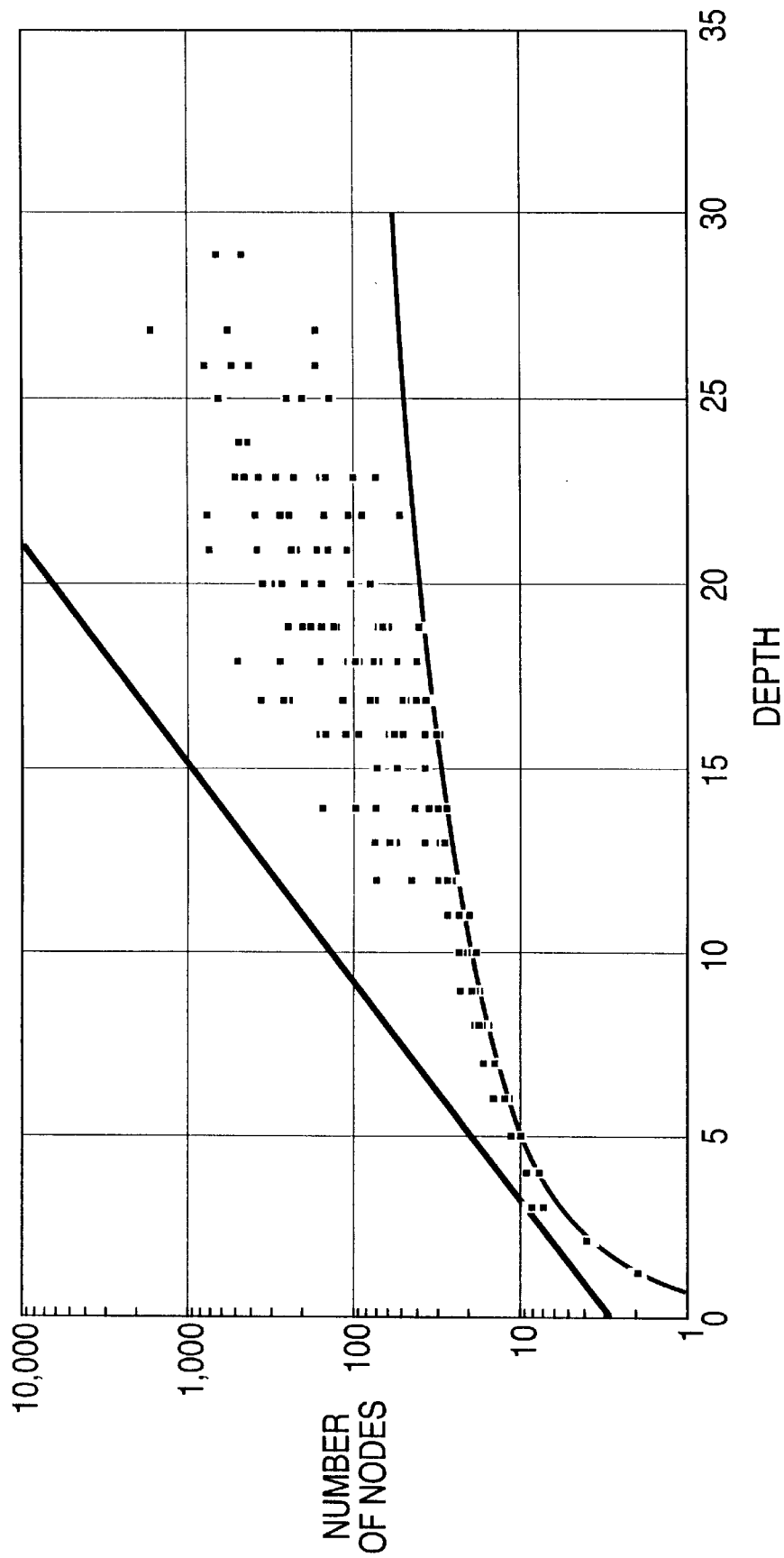
FIG. 20 shows the relationship between the depth of the 50,000th problem to the 2000 problems and the number of expanded nodes.

FIGS. 18 through 20 show the effect of the present invention. In these figures, the horizontal axis indicates the depth of the solution to the problem, that is, the number of steps required to actually solve the problem. The vertical axis indicates the number of nodes expanded to the depth of the problem.

FIG. 18 shows the plot of the solution depth to the number of expanded nodes corresponding to 2000 problems at the first step in which the learning process in the neural network has not proceeded.

FIG. 19 shows the results of 2000 problems at the stage at which the 10000th problem has been solved, that is, when the learning has proceeded to a certain extent. It indicates that the number of expanded nodes is increasing.

FIG. 20 shows the results of 2000 problems when the learning process has terminated at 50000 problems. The learning has sufficiently proceeded and the number of expanded nodes is smaller than one several hundredth of the number shown in FIG. 18. Since the time required to solve the solution is proportional to the number of expanded nodes, the problem can be solved within one several hundredth of the time. Furthermore, problems larger than 25 steps in depth, which are not solved at the first stage shown in FIG. 18, can be successfully solved.

Figure 21B:
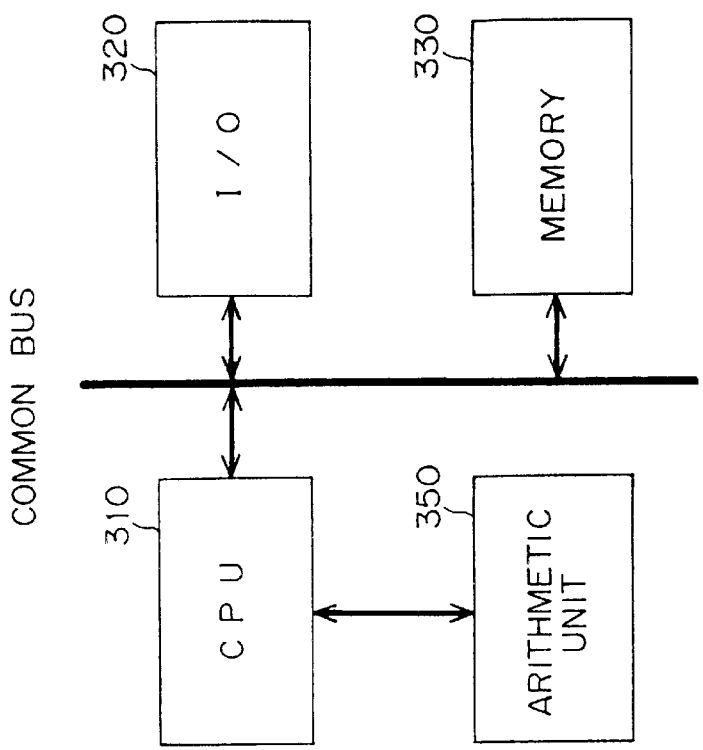
FIGS. 21A and 21B show the computer environment in which the problem solving apparatus according to the present invention is realized.
Figure 21A:
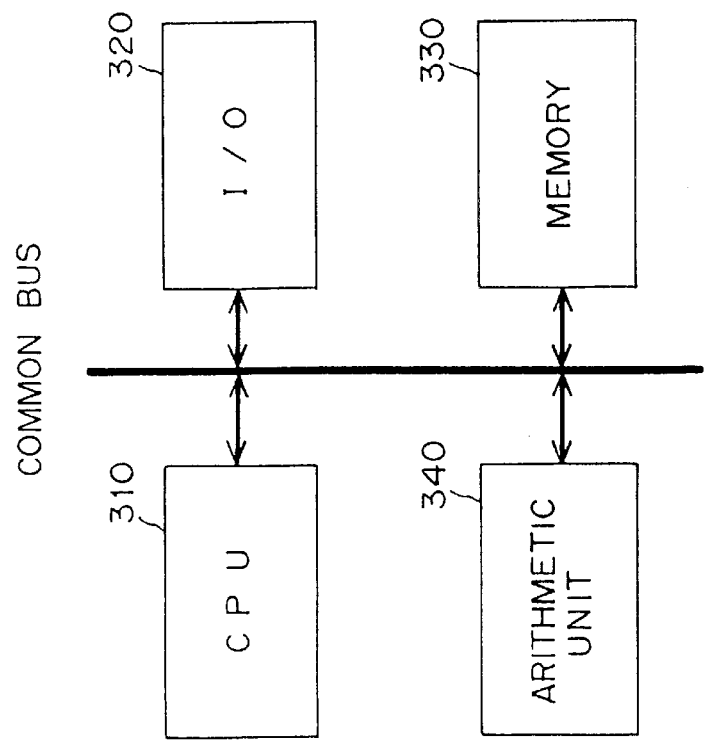

FIGS. 21A and 21B show examples of the computer environments in which the problem solving apparatuses having learning functions according to the present invention can be realized.

FIG. 21A shows an example of a system for which an external arithmetic unit is provided. In FIG. 21A, a CPU 310, an I/O 320, a memory 330, and an arithmetic unit 340 are connected to a common bus. The CPU 310 is a central processing unit for controlling the entire system and, for example, controls the I/O 320 through the common bus to transmit data, etc.

The memory 330 can be, for example, a weight memory 219 shown in FIG. 5, and temporarily stores the data used in a problem solving process, a learning process through a neural network, etc. For example, it can be RAM, etc. An arithmetic unit 340 is an operating unit for realizing the function of computing an evaluation value by the node evaluating apparatus 215.

FIG. 21B shows an example of a built-in arithmetic unit. With the configuration shown in FIG. 21B, an arithmetic unit 350 is not connected to the common bus, but connected to the CPU 310. Otherwise, the configuration is the same as that shown in FIG. 21A.

As described in detail above, a problem can be efficiently solved in a symbol process through a neural network without heuristic knowledge or using a very simple heuristic knowledge (a Manhattan distance, the number of incorrectly-positioned tiles, etc.) according to the present invention. That is, since obtaining a solution using a problem solved already through effective but complicated heuristic knowledge is attained from experience by the operations of a user, it is generally difficult to actually obtain the solution and is a time-consuming job. However, the problem solving apparatus according to the present invention automatically obtains the solution.

In solving a problem similar to a problem solved already, the time required to solve the problem can be shortened, thereby considerably improving the performance of the problem solving apparatus.

The problem solving apparatus having the learning function according to the present invention can be realized by a program. That is, the program can totally or partially realize the function of obtaining a solution by solving a problem in a symbol process, the neural network function of outputting a hint on solving the problem, and the function of making the neural network learn data using the solution. In this case, storage media such as FD, CD-ROM, MO, etc. store program codes to realize the above described functions in a computer-readable format. The computer can realize the functions by reading and executing the program codes.

What is claimed is:

1. A problem solving acceleration apparatus for shortening a search time in a problem solving unit which uses a tree-search method by a symbol process to obtain a solution to a given problem, the accelerated problem solving apparatus, comprising:

a neural network which analyzes the given problem and provides a hint to the problem solving unit, the hint indicating a node to be next processed in the tree-search method which allows the problem solving unit to detect an optimum path to a solution to the given problem quicker; and neural network learning control means for training said neural network means by performing a learning process based on the solution to the problem, wherein said learning process presents a set of training points sufficient to train the neural network.

2. The problem solving acceleration apparatus according to claim 1, wherein said neural network provides the problem solving unit with a hint in response to the given problems based on a result of the learning process.

3. The problem solving acceleration apparatus according to claim 1, wherein the problem solving unit obtains a solution to the given problem through a tree search.

4. The problem solving acceleration apparatus according to claim 3, wherein the problem solving unit outputs a path from a starting node to a goal node through more than one node as the solution obtained through the tree search in response to the given problem;

said neural network is a hierarchical neural network; and said neural network learning control means provides, for an input layer unit in the hierarchical neural network, data corresponding to one of two consecutive nodes, whichever is closer to the starting node in the path, and provides data, as teaching data to an output layer, corresponding to a child node to the node closer to the starting node, thereby performing the learning process.

5. The problem solving acceleration apparatus according to claim 4, wherein the hint output by said neural network is a child node to be selected from among a plurality of child nodes to a parent node in the path for the given problem being processed by the problem solving unit.

6. The problem solving acceleration apparatus according to claim 3, wherein said tree search is performed using a best first method in which an order of expanding nodes is determined in such a way that a minimum evaluation value can be obtained by a predetermined equation.

7. The problem solving acceleration apparatus according to claim 6, wherein said problem solving unit comprises:

node expanding means for obtaining and outputting a child node to a node selected when a value of the evaluation function is a minimum value from among unexpanded nodes; and node evaluating means for setting an evaluation function value for a child node by subtracting a value from an evaluation function value computed by the predetermined equation when a hint output from said neural network matches an output from said node expanding means in the selected node, and for setting an evaluation function value computed by the predetermined equation as the evaluation function value when the hint output from said neural network does not match the output from said node expanding means.

8. The problem solving acceleration apparatus according to claim 7, wherein said node evaluating means sets the value in such a way that the evaluation function value for the child node obtained by subtracting the value from an original function value indicates a minimum value of all unexpanded nodes.

9. The problem solving acceleration apparatus according to claim 1, wherein said neural network is a three-layer hierarchical neural network.

10. The problem solving acceleration apparatus according to claim 1, wherein the hint output by said neural network is a direction in which a space is to be moved between an arrangement being processed by the problem solving unit and a next arrangement when the given problem defines alteration of an arrangement of numbered tiles by sequentially moving the space.

11. The problem solving acceleration apparatus according to claim 1, wherein the hint output by said neural network is data indicating a position of a space in a next arrangement upon receipt of data indicating an arrangement being processed by the problem solving unit and a next arrangement when the given problem defines alteration of an arrangement of numbered tiles by moving the space.

12. The problem solving acceleration apparatus according to claim 1, wherein said neural network learning control means makes said neural network perform the learning process using a back-propagation method.

13. A problem solving acceleration apparatus, for shortening a search time in a problem solving unit, which utilizing a tree search method by a symbol process expands and evaluates a node, to obtain a solution to a given problem, the accelerated problem solving apparatus comprising:

a neural network;

a neural network learning control unit for making said neural network perform a learning process on a solution obtained by the problem solving unit, wherein said learning process presents a set problems and solutions sufficient to train the neural network; and a hint providing means for inputting the given problem to said neural network, obtaining an output depending on a result of the learning process, and providing the output for said problem solving unit as a hint indicating a node to be next processed in the tree search method to allow the problem solving unit to detect an optimum path to a solution to the given problem quicker.

14. A method of accelerating and shortening a search time in a computerized problem solving unit which utilizes a a tree search method by a symbol process, comprising the steps of:

providing a problem to the problem solving unit;

training a neural network by performing a learning process using a solution sequentially given by the problem solving unit so as to learn to produce a hint indicating a node to be next processed in the tree search method to solve the problem quicker, wherein said learning process presents a set of problems and solutions sufficient to train the neural network;

inputting a second problem to both the problem solving unit and to the neural network, and providing a hint indicating a node to be next processed in the search tree method for the problem solving unit from the neural network; and obtaining, using the problem solving unit and the hint, an optimum path to a solution to the input second problem.

15. The method according to claim 14, wherein a plurality of problems corresponding to each solution for which the neural network performs a learning process are not similar to one another; and a problem to be solved using the hint is similar to at least one of problems corresponding to solutions obtained in the learning process performed by the neural network.

16. A program on a computer-readable storage medium comprising the functions:

obtaining a solution to a given problem using tree search method by a symbol process;

causing a neural network to perform a learning process based on the obtained solution to learn how to provide a hint indicating a node to be processed in the tree search method to detect an optimum path to a solution quicker, wherein said learning process presents a set of problems and solutions sufficient to train the neural network; and obtaining a solution to a problem by inputting the problem to both the neural network and the symbol process, the solution to the problem being output by the symbol process and arrived at using the hint output from the neural network.

17. A method of training a neural network to provide a hint to a problem solving unit that uses the hint to reduce the amount of processing time required to find a solution, comprising:

presenting a problem to the problem solving unit;

generating a solution by the problem solving unit;

inputting the problem and the solution generated by the problem solving unit to the neural network to generate a set of training points;

repeating the steps of presenting, generating and inputting until a sufficient set of training points is established to train the neural network to provide a hint indicating a node to be processed next in a tree search method to a problem input to detect an optimum path to a solution;

inputting a new problem to both the problem solving unit and to the neural network;

determining a hint indicating a node to be next processed in the tree search method for the new problem by the neural network and providing the hint to the problem solving unit;

modifying the tree search method by the problem solving unit based on the hint that indicates a node to be next processed in the tree search method determined by the neural network;

solving the new problem by the problem solving unit using the hint; and displaying the solution to a user.

* * * * *